United States Patent
Langhans

(10) Patent No.: US 8,806,963 B2
(45) Date of Patent: Aug. 19, 2014

(54) MEASURING DEVICE AND ROBOT

(75) Inventor: Michael Langhans, Balzhausen (DE)

(73) Assignee: KUKA Roboter GmbH, Augsburg (DE)

(*) Notice: Subject to any disclaimer, the term of this patent is extended or adjusted under 35 U.S.C. 154(b) by 425 days.

(21) Appl. No.: 13/093,493

(22) Filed: Apr. 25, 2011

(65) Prior Publication Data

US 2011/0283815 A1 Nov. 24, 2011

(30) Foreign Application Priority Data

May 20, 2010 (DE) .......................... 10 2010 029 186

(51) Int. Cl.
*G01L 3/00* (2006.01)
(52) U.S. Cl.
USPC .................................................. 73/862.338
(58) Field of Classification Search
None
See application file for complete search history.

(56) References Cited

U.S. PATENT DOCUMENTS

2003/0062982 A1 4/2003 Schafert et al.
2010/0324733 A1* 12/2010 Bischoff et al. .............. 700/258

FOREIGN PATENT DOCUMENTS

| DE | 36 11 336 A1 | 10/1987 |
|---|---|---|
| DE | 100 41 989 A1 | 3/2002 |
| DE | 102 17 014 A1 | 11/2003 |
| DE | 10 2006 022 889 A1 | 11/2007 |
| DE | 10 2007 040 106 A1 | 2/2009 |
| DE | 10 2007 063 099 A1 | 7/2009 |
| EP | 1445075 A2 | 8/2004 |
| EP | 1 752 361 A1 | 2/2007 |
| GB | 2 285 865 A | 7/1995 |
| JP | 2000 146723 A | 5/2000 |
| WO | 2006/053244 A2 | 5/2006 |

OTHER PUBLICATIONS

European Patent Office; Search Report in European Patent Application No. 11 16 5299 Dated Sep. 15, 2011; 8 pages.
German Patent Office; Search Report in German Patent Application No. 10 2010 029 186.2 Dated Jun. 3, 2011; 8 pages.
Schicker, R., Wegener, G.; "Drehmoment richtig messen"; Hrsg.; Hottinger Baldwin Messtechnik GmbH, Darmstadt (2002), s. 177-220.

* cited by examiner

*Primary Examiner* — Lisa Caputo
*Assistant Examiner* — Brandi N Hopkins
(74) *Attorney, Agent, or Firm* — Wood, Herron & Evans, LLP

(57) ABSTRACT

The invention relates to a measuring device (20) for ascertaining a torque acting on an axis (A2,) and to a robot (1) with a robot arm (2) having a plurality of members which are rotatably mounted in reference to axes (A1-A6). The robot (1) also has the measuring device (20), in order to determine for at least one of the axes (A2) the torque exerted on that axis (A2).

9 Claims, 2 Drawing Sheets

MEASURING DEVICE AND ROBOT

Figure 1:
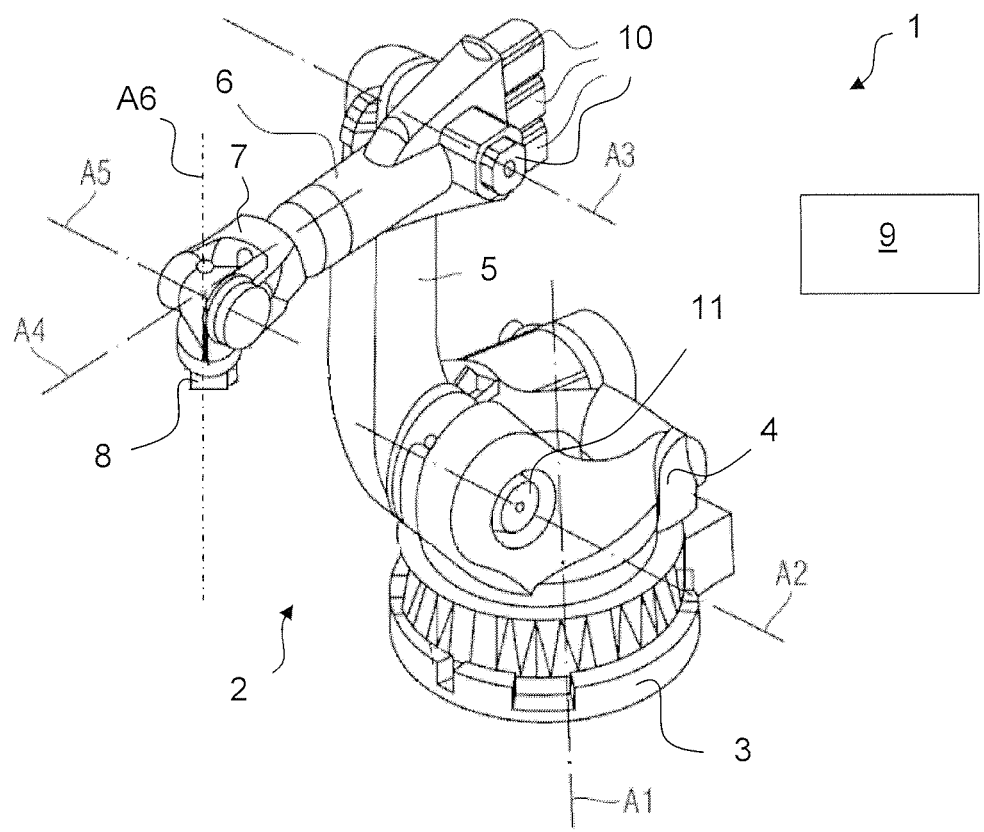

The invention relates to a measuring device and a robot having this measuring device.

Robots are working machines, which are equipped with tools for automatic handling and/or processing of objects, and are programmable in a plurality of motion axes, for example with regard to orientation, position and process sequence. Robots usually have a robot arm with a plurality of members connected via joints, and programmable controllers (control devices) which control or regulate the motion sequences of the robot during operation. The members are moved by means of drives which are activated by the control device, in particular in reference to the axes of motion.

DE 10 2007 063 099 A1 discloses a robot having a plurality of members that are rotatable relative to each other in reference to axes of rotation. In order to ascertain the torques exerted on the axes of rotation, the robot includes suitable sensors, which include for example strain gauges whose ohmic resistances change when the strain gauge is lengthened or shortened. The individual sensors may have a plurality of strain gauges, which are wired for example as half or full bridges. In order to increase the reliability of the torque detection, for at least one of the axes of rotation two sensors and redundant evaluating devices may be provided for redundant evaluation.

The object of the invention is to specify an improved measurement of torque, in particular using secure technology.

The object of the invention is fulfilled by a measuring device for ascertaining a torque acting on an axis, having
- a first device, which is set up to generate a first analog electrical signal assigned to the torque,
- a first analog-digital converter connected downline from the first device, which is set up to generate from the first analog electrical signal a first digitized signal assigned to the torque,
- a first digital evaluating device, connected downline from the first analog-digital converter, which is set up to ascertain the torque from the first digitized signal,
- a second device, which is set up to generate a second analog electrical signal assigned to the torque,
- a second analog-digital converter connected downline from the second device, which is set up to generate from the second analog electrical signal a second digitized signal assigned to the torque,
- a second digital evaluating device, connected downline from the second analog-digital converter, which is set up to ascertain the torque from the second digitized signal, independent of the first digital evaluating device.

The torque exerted on the axis is exerted for example by a member which is mounted rotatably in reference to the axis, in particular relative to another member, or is connected to the other member via a joint, so that the torque acts on the joint.

Another aspect of the invention relates to a robot having a control device, a robot arm that is movable by means of the control device, which has a plurality of members, at least one of which, controlled by the control device, is movable in reference to an axis by means of a drive having a transmission, and the measuring device according to the invention. In particular, the first device and the second device of the measuring device according to the invention may be coupled with the transmission in such a way that the first and second analog electrical signals are each assigned to an output-side torque measurement of the relevant member in reference to their axes.

The measuring device according to the invention accordingly includes two torque measurements, separate from each other, which result in a relatively small wiring expense due to the relatively few components. As a result, the measuring device according to the invention can be of space-saving design.

The first device may preferably have a first strain gauge or a group of first strain gauges, which are applied in particular to a mechanical measurement body. The second device may have a second strain gauge or a group of second strain gauges, which are applied in particular to another mechanical measurement body. It is also possible to place the first and second strain gauges, or the groups of first and second strain gauges, on a common measurement body.

Ascertaining torque by means of one or more strain gauges is known in principle to a person skilled in the art, for example from DE 10 2007 063 099 A1 named in the introduction. Strain gauges are construction elements that convert in particular even a relatively small change in length, such as occurs for example due to the influence of an external force or external torque, to a measurable change in electrical resistance. The strain gauge or gauges are attached for example to an appropriately mechanically designed measurement body. The measurement body may preferably be designed in such a way that a possibly slight, reversible mechanical deformation of the measurement body results from a mechanical torque applied to the measurement body, which is transmitted to the strain gauge or gauges. A suitable mechanical design of the measurement body and of the strain gauge or gauges results in a change of resistance in the strain gauge proportional to the torque.

A measurement of torque using a mechanical measurement body and a strain gauge placed on it, possibly adhering to it, is also realizable for example in light-weight robots, since the measurement body and strain gauge can also be of relatively small construction and hence of space-saving design.

Preferably a plurality of strain gauges are used, in particular four strain gauges per device, which are joined in a bridge circuit (full bridge) known in principle to a person skilled in the art. An advantage of the bridge circuit can be that the device is less temperature-dependent.

There may also be provision for the first analog electrical signal to be processed by means of a first analog signal processing device connected between the first device and the first analog-digital converter, so that the analog-processed first analog electrical signal is routed to the first analog-digital converter. In addition or alternatively, there may also be provision for the second analog electrical signal to be processed by means of a second analog signal processing device connected between the second device and the second analog-digital converter, so that the analog-processed second analog electrical signal is routed to the second analog-digital converter. The signal processing devices are for example filters and/or amplifiers.

The first digital evaluating device may preferably be designed as a first FPGA, and/or the second digital evaluating device may preferably designed as a second FPGA. A field programmable gate array, abbreviated "FPGA," is an integrated circuit of digital technology into which a logical circuit may be programmed.

The FPGAs may also already assume a multitude of other tasks in the joint, such as regulation, interface to the controller, etc. These circuits make it possible for the torque detection according to the invention to be realized relatively simply, and accordingly also inexpensively. As a result, it is possible to avoid additional freely programmable elements for the measuring device according to the invention. These not only have the disadvantage of requiring increased space, but also necessitate relatively complicated software development, possibly with relatively expensive acceptance and approval.

The measuring device according to the invention may be used to detect a torque exerted on the axis by a member which is mounted rotatably relative to the axis. The member may be in particular rotatable relative to another member in reference to the axis, by means of a drive having a transmission. The measuring device according to the invention can then be designed so that the first device and the second device are coupled with the transmission in such a way that the first and second analog electrical signals are assigned to a torque measurement on the output side.

According to a preferred variant of the measuring device according to the invention, the first analog-digital converter and the second analog-digital converter are combined into a first assembly. This assembly may be of relatively space-saving design, and accordingly may be attached relatively well in or on the member on the output side. The two analog signal processing devices may then possibly also be part of this first assembly.

The two digital evaluating devices may preferably be combined into a second assembly. The first analog-digital converter may communicate with the first digital evaluating device via a first bus or a first connecting line, and the second analog-digital converter may communicate with the second digital evaluating device via a second bus or a second connecting line. Since the two analog-digital converters communicate with their evaluating devices according to this variant via separate lines or buses, this signal transmission does not need to be provided with special monitoring methods such as a checksum.

The measuring device according to the invention is provided in particular so that the two torque measurements are compared with each other, whether by an external device or by at least one of the two evaluating devices. To that end, it is desirable that the torque measurements be made at the same time. In order to ensure this, one of the digital evaluating devices may send a command to the two analog-digital converters, in particular via a third bus or a third line, so that they will generate their digitized signals and deliver them to the respective evaluating devices. This enables the two torque measurements to be synchronized in a relatively simple way. The command that one of the two evaluating devices generates may also be sent to the other evaluating device, for example via another connecting line or another bus, in order to also synchronize the two evaluating devices.

The two digital evaluating devices may also be connected via a fourth bus or a fourth connecting line, in order to exchange information about the ascertained torques. A cross-comparison for example of the two torque measurements by means of at least one of the two evaluating devices is then possible.

According to one embodiment of the measuring device according to the invention, the latter includes a first electrical voltage source which is set up to produce a first reference voltage for the second device, and a second electrical voltage source which is set up to produce a second reference voltage for the first device. Hence each of the two devices may have its own reference voltages assigned to it, which enables the reliability of the measuring device according to the invention to be increased. The reference voltages are necessary in particular when the devices include at least one strain gauge.

According to a preferred embodiment of the measuring device according to the invention, the first electrical voltage source is designed as a first digital-analog converter and/or the second electrical voltage source is designed as a second digital-analog converter. This variant is especially advantageous when according to one variant of the measuring device according to the invention the first digital evaluating device is connected with the first digital-analog converter in order to set the value of the first reference voltage produced by the first digital-analog converter, and/or the first digital evaluating device is likewise connected with the second digital-analog converter in order to set the value of the second reference voltage produced by the second digital-analog converter. It is then possible in a relatively simple way to check the functioning of the measuring device according to the invention, controlled by the digital evaluating devices. The measuring device according to the invention may then be set up to check its functioning itself. It is also possible that the second evaluating device activates both digital-analog converters, so that they produce the desired reference voltages. It is also possible that one of the evaluating devices activates one of the digital-analog converters and the other evaluating device activates the other digital-analog converter, so that the desired reference voltages are produced.

In order to be able to configure the measuring device according to the invention as compactly as possible, the first analog-digital converter and the first digital-analog converter may preferably be combined into a first integrated component, and/or the second analog-digital converter and the second digital-analog converter may be combined into a second integrated component.

Depending on the embodiment of the measuring device according to the invention, the analog signal chain may be tested by the possibly integrated digital-analog converter. That makes it possible to keep the expense of wiring and components relatively low.

An additional advantage of the measuring device according to the invention may be, depending on the embodiment, that possibly due to a lowering of the supply or reference voltage of the devices, provided for test purposes, the measurement signal always changes only in proportion to the applied supply or reference voltage. Since the voltage value specified for the test is possibly known to the digital electronics, the bridge diagonal voltages that are possibly measured during the self-test may also be used to calculate a torque. Hence no "gaps" develop in the time sequence of the detection of measurements.

Figure 2:
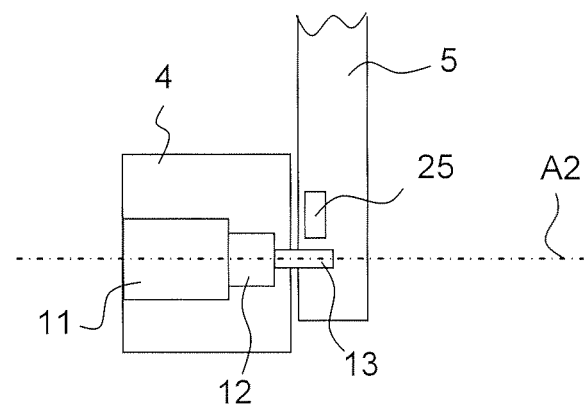

An example of an exemplary embodiment of the invention is depicted in the attached schematic figures. The figures show the following:

FIG. 1 a robot with a robot arm having a plurality of members,

FIG. 2 a cross-sectional depiction of a detail of the robot, and

Figure 3:
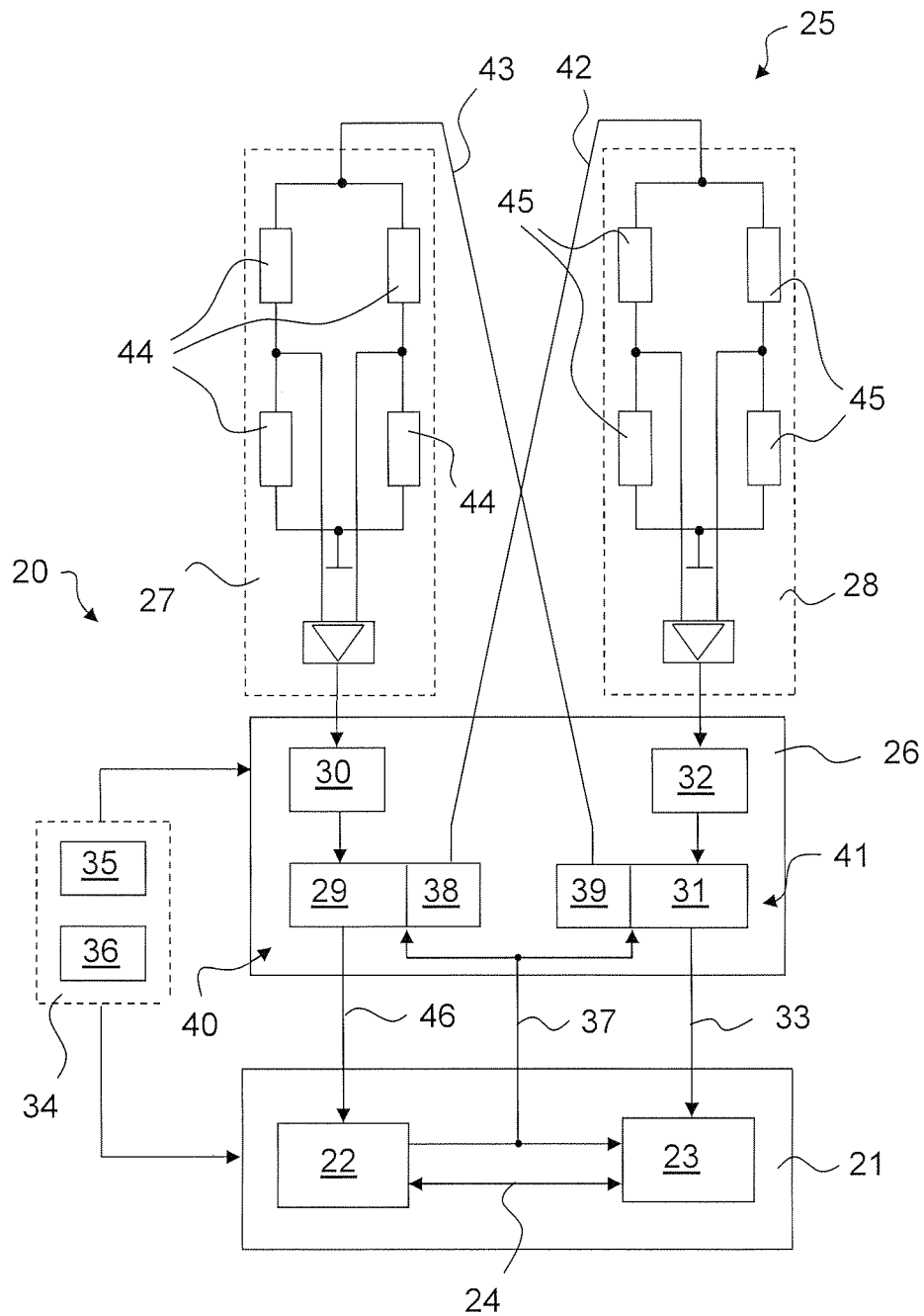

FIG. 3 a measuring device for detecting a torque that one of the members of the robot arm exerts on its axis.

FIG. 1 shows a perspective view of a robot 1 having a robot arm 2.

In the case of the present exemplary embodiment, robot arm 2 includes a plurality of members, arranged sequentially and connected by joints. The members are in particular a stationary or movable base 3 und a carousel 4 that is mounted so that it is rotatable relative to base 3 around a vertical axis A1, which is also referred to as axis 1. Other members of robot arm 2 in the case of the present exemplary embodiment are a motion link 5, an extension arm 6 and a preferably multiaxial robot hand 7 having a flange 8. Motion link 5 is mounted at the lower end on carousel 4, for example on a swivel bearing head that is not shown in further detail, so that it can swivel around a preferably horizontal axis A2, which is also referred to as axis 2. At the upper end of motion link 5, extension arm 6 in turn is mounted so that it can swivel around a likewise preferably horizontal axis A3. At its end this arm carries robot hand 7, with its preferably three axes A4, A5, A6.

In order to move robot 1 or its robot arm 2, the latter includes drives, in particular electric drives, that are connected in a generally known way to a control device 9. Only some of the electric motors 10, 11 of these drives are shown in FIG. 1.

FIG. 2 shows a cross-sectional view of carousel 4 and part of motion link 5, which is movable relative to carousel 4 in reference to axis A2 by means of electric motor 11. In the case of the present exemplary embodiment, there is a transmission 12 assigned to each of the individual motors 10, 11, by which the motors 10, 11 move their respective members, for example the motion link 5, by means of a shaft 13.

In the case of the present exemplary embodiment, the individual torques which the members exert on their axes A1-A6 or shafts 13 are each ascertained by means of a measuring device 20 shown in FIG. 3. The output signals of the measuring devices 20, i.e., the corresponding ascertained torques, are conveyed for example to control device 9.

In the case of the present exemplary embodiment, measuring device 20 has an assembly or digital evaluation electronics 21, which may be for example part of control device 9, or is attached for example in or on robot arm 2, preferably in or on base 3 of robot 1. According to another preferred exemplary embodiment, the provided device is used in every joint of the robot and measures the torque that occurs there.

In the case of the present exemplary embodiment, digital evaluating device 21 has a first digital evaluating device 22 and a second evaluating device 23 that operates separate from or independent of first evaluating device 22. The two evaluating devices 22, 23 are designed for example as FPGAs (field programmable gate arrays), and are able to communicate via a connecting line or bus 24, which is designed for example as an SPI bus.

Furthermore, in the case of the present exemplary embodiment measuring device 20 has another assembly or detecting device 25, which has in particular a circuit board 26 on which a plurality of electronic components are situated. Detecting device 25 is situated on the output side in reference to the individual motors 10, 11 or transmissions 12, in or on robot arm 2. For example, in the case of the present exemplary embodiment, detection device 25, which ascertains the torque exerted by motion link 5, is attached to the motion link.

In the case of the present exemplary embodiment, detection device 25 includes a first device 27, which is set up to produce a first analog electrical signal assigned to the torque, and a second device 28, which is set up to produce a second analog electrical signal assigned to the torque.

First device 27 includes for example at least one strain gauge 44, which is mechanically situated, for example glued, on a measurement body which is not shown in further detail, known in principle to a person skilled in the art. The measurement body of first device 27 is for example mechanically coupled with transmission 12, so that in the present case a torque measurement on the output side is enabled.

In the present exemplary embodiment, first device 27 includes four first strain gauges 44 which are combined into a bridge circuit, as depicted in FIG. 3.

Because of a torque acting from the relevant member on its axis, the measurement body is lengthened, which in turn results in a lengthening or shortening of the first strain gauges 44. When the first strain gauges 44 are lengthened, an increase in the electrical resistance results, and when the first strain gauges are shortened a decrease in the resistance results. Due to the arrangement of the first strain gauges 44 in a bridge circuit, the output signal of first device 27, known as the unbalance voltage, is proportional to the measured torque.

Second device 28 is designed similar to first device 27 in the case of the present exemplary embodiment, and therefore has another measurement body, not depicted in further detail, for example coupled mechanically with transmission 12, to which second strain gauges 45 are attached. The second strain gauges 45 are also connected in a bridge circuit, so that the output signal of second device 28 is proportional to the measured torque due to this arrangement of the second strain gauges 45. The first and second strain gauges 44, 45 of the first and second devices 27, 28 may also be situated jointly on one measurement body, so that a compact overall structure is attainable.

The output of first device 27 is connected to the input of a first analog-digital converter 29 of detection device 25. In order for example to smooth the output signal of first device 27 or adapt it to first analog-digital converter 29, a first analog signal processing device 30 may be provided between first device 27 and first analog-digital converter 29, as provided in the exemplary embodiment shown, which processes the analog output signal of first device 27, for example filtering and/or amplifying it. The output signal of first device 27, processed by means of first analog signal processing device 30, is the input signal of first analog-digital converter 29. The output signal of first analog-digital converter 29 is thus likewise a measure of the torque produced by motion link 5 in digital form.

First analog-digital converter 29 is connected with first evaluating devices 22, for example via a connecting line or bus 46, which is preferably designed as an SPI bus. First evaluating device 22 is set up to ascertain the torque exerted by motion link 5, on the basis of the output signal coming from first analog-digital converter 29.

The output of second device 28 is connected to the input of a second analog-digital converter 31 of detection device 25. In order for example to smooth the output signal of first device 28 or adapt it to second analog-digital converter 31, a second analog signal processing device 32 may be provided between second device 28 and second analog-digital converter 31, as provided in the exemplary embodiment shown, which processes the analog output signal of second device 28, for example filtering and/or amplifying it. The output signal of second device 28, processed by means of second analog signal processing device 32, is the input signal of second analog-digital converter 31. The output signal of second analog-digital converter 31 is thus likewise a measure of the torque exerted by motion link 5 in digital form.

Second analog-digital converter 31 is connected with second evaluating devices 23, for example via a connecting line or bus 33, which is preferably designed as an SPI bus. Second evaluating device 23 is set up to ascertain the torque exerted by motion link 5, on the basis of the output signal coming from second analog-digital converter 31.

The two analog signal processing devices 30, 32 and the two analog-digital converters 29, 31 are in particular all attached to circuit board 26, so that they form an assembly. The two devices 27, 28 may be connected for example with their signal processing devices 30, 32, for example via relatively short cables.

Measuring device 20 thus offers two torque measurements of motion link 5, operating independently of one another.

The two evaluating devices 22, 23 are able to communicate via bus 24, and thus compare their torque measurements to each other. The two evaluating devices 22, 23, or at least one of the two evaluating devices 22, 23, may be connected to control device 9, which processes the measured torques further.

In the case of the present exemplary embodiment, measuring device 20 also has an electrical energy supply 34, for example with two voltage supplies 35, 36 for the analog and digital signal processing. Voltage supply 35 produces for example an electrical voltage for the two analog signal processing devices 30, 32, and electrical voltage supply 36 produces for example an electrical voltage for the two analog-digital converters 29, 31 and the two evaluating devices 22, 23.

In the case of the present exemplary embodiment, digital evaluating device 22 is designed so that it requests an A/D conversion via a common connecting line or bus line 37 simultaneously from analog-digital converter 29 and from analog-digital converter 31. This ensures that the two evaluating devices 22, 23 ascertain the torques of motion link 5 at the same instant.

The two analog-digital converters 29, 31 thereupon ascertain a torque independently and transmit it to the respective digital evaluating unit 22, 23. An SPI bus connection is preferably formed of three data lines 46, 33, 37, where one data line 37 serves as an input line and the other two data lines 33, 46 serve as output lines of circuit board 26.

For monitoring purposes, it may be provided that the demand for A/D from evaluating device 22 is also transmitted to evaluating device 23.

In the case of the present exemplary embodiment, the two devices 27, 28 each require an electrical reference voltage. These are produced in the case of the present exemplary embodiment by a first digital-analog converter 38 and a second digital-analog converter 39. In particular, first digital-analog converter 38 produces the reference voltage for second device 28, and second digital-analog converter 39 produces the reference voltage for first device 27. To that end, first digital-analog converter 38 is connected to the second strain gauges 44 of second device 28 via an electric line 42, and second digital-analog converter 39 is connected to the second strain gauges 45 of first device 27 via an electric line 43.

Furthermore, in the case of the present exemplary embodiment, first analog-digital converter 29 and first digital-analog converter 38 are designed as a first integrated component 40, and second analog-digital converter 31 and second digital-analog converter 39 are designed as a second integrated component 41.

In order to achieve a reliable determination of the torque of motion link 5, it should be ensured, among other things, that the electrical voltages present at the inputs of the two analog-digital converters 29, 31 are not falsified. In order to check this, there is provision in the case of the present exemplary embodiment to intentionally falsify the input signals of the two analog-digital converters 29, 31 for test purposes. This is performed for example as follows:

Using a command generated by first determining device 22 and transmitted via data line 37 to the two digital-analog converters 38, 39, the two digital-analog converters 38, 39 change their output voltages, and thus the supply voltages or reference voltages of the two devices 27, 28. This changes the output signals of devices 27, 28, and thus the output signals of data lines 46, 33 of the two analog-digital converters 29, 31. In this way, the two determining devices 22, 23 are able to detect an error in the analog signal chains, i.e., the signal paths from the two devices 27, 28 to the two analog-digital converters 29, 31.

Since the test of the analog signal chain is done using the integrated digital-analog converters 38, 39, it is possible to reduce the expense of wiring within the joint assigned to motion link 5.

According to a preferred exemplary embodiment, the described test may be performed for all joints of the robot, so that an error in the analog signal chains of any link is reliably detectable.

The invention claimed is:

1. A measuring device for ascertaining a torque acting on an axis of a robot, the measuring device comprising:
   a first device generating a first analog electrical signal related to the torque;
   a first analog-digital converter receiving the first analog electrical signal and generating a first digital signal related to the torque in response thereto;
   a first digital evaluating device communicating with the first analog-digital converter and ascertaining the torque in response to the first digital signal;
   a second device generating a second analog electrical signal related to the torque;
   a second analog-digital converter receiving the second analog electrical signal and generating a second digital signal related to the torque in response thereto;
   a second digital evaluating device communicating with the second analog-digital converter and ascertaining the torque in response to the second digital signal independently of the first digital evaluating device;
   a first electrical voltage source comprising a first digital-analog converter producing a first reference voltage that is communicated to the second device; and
   a second electrical voltage source comprising a second digital-analog converter producing a second reference voltage that is communicated to the first device, wherein at least one of:
   the first digital evaluating device is connected to the first digital-analog converter and sets the value of the first reference voltage produced by the first digital-analog converter, or
   the first digital evaluating device is connected to the second digital-analog converter and sets the value of the second reference voltage produced by the second digital-analog converter.

2. The measuring device of claim 1, further comprising:
   a first analog signal processing device that receives the first analog electrical signal from the first device, processes the first analog electrical signal, and routes the analog-processed first analog electrical signal to the first analog-digital converter; and/or
   a second analog signal processing device that receives the second analog electrical signal from the second device, processes the second analog electrical signal, and routes the analog-processed second analog electrical signal to the second analog-digital converter;
   wherein:
   the first device comprises at least one first strain gauge configured as a full bridge, and/or
   the second device comprises at least one second strain gauge configured as a full bridge, and/or
   at least one of the first digital evaluating device or the second digital evaluating device comprises a field programmable gate array.

3. The measuring device of claim 1, wherein at least one of (a) the first and second analog-digital converters, or (b) the first and second digital evaluating devices, are combined into an assembly; and wherein:

the first analog-digital converter communicates with the first digital evaluating device via a first data line; and/or
the second analog-digital converter communicates with the second digital evaluating device via a second data line.

4. The measuring device of claim 1, wherein:
one of the first or second digital evaluating devices sends a signal to the first and second analog-digital converters via a third data line to cause the first and second analog-digital converters to generate the respective first and second digital signals and communicate the first and second digital signals to the respective first and second evaluating devices.

5. The measuring device of claim 4, wherein the first or second digital evaluating device sends a signal to the first and second analog-digital converters simultaneously.

6. The measuring device of claim 4, wherein:
the first, second, and third data lines form a Serial Peripheral Interface data bus;
the first and second data lines serve as output lines; and
the third data line serves an input line.

7. The measuring device of claim 1, wherein the first and second digital evaluating devices exchange information related to the ascertained torques via a bus connected therebetween.

8. The measuring device of claim 1 wherein at least one of (a) the first analog-digital converter and the first digital-analog converter, or (b) the second analog-digital converter and second digital-analog converter, are combined into an integrated component.

9. A robot, comprising:
a control device;
a robot arm having a plurality of members controlled for movement by the control device, at least one of the plurality of members movable about an axis of rotation by a drive having a transmission; and
a measuring device for ascertaining a torque acting on the axis, comprising:
a first device generating a first analog electrical signal related to the torque,
a first analog-digital converter receiving the first analog electrical signal and generating a first digital signal related to the torque in response thereto,
a first digital evaluating device communicating with the first analog-digital converter and ascertaining the torque in response to the first digital signal,
a second device generating a second analog electrical signal related to the torque,
a second analog-digital converter receiving the second analog electrical signal and generating a second digital signal related to the torque in response thereto, and
a second digital evaluating device communicating with the first analog-digital converter and ascertaining the torque in response to the second digital signal;
a first electrical voltage source comprising a first digital-analog converter producing a first reference voltage that is communicated to the second device; and
a second electrical voltage source comprising a second digital-analog converter producing a second reference voltage that is communicated to the first device, wherein at least one of:
the first digital evaluating device is connected to the first digital-analog converter and sets the value of the first reference voltage produced by the first digital-analog converter, or
the first digital evaluating device is connected to the second digital-analog converter and sets the value of the second reference voltage produced by the second digital-analog converter,
wherein the first device and the second device are operatively coupled with the transmission such that the first and second analog electrical signals are each assigned to an output-side torque measurement of the at least one member relative to the axis of rotation.

* * * * *